United States Patent [19]

Stormer

[11] 3,724,615
[45] Apr. 3, 1973

[54] SHOCK ABSORBER WITH WELDED PISTON

[75] Inventor: Joseph R. Stormer, Vandalia, Ohio

[73] Assignee: General Motors Corporation, Detroit, Mich.

[22] Filed: Feb. 16, 1971

[21] Appl. No.: 115,222

[52] U.S. Cl. ................................. 188/322, 188/317
[51] Int. Cl. .............................................. F16f 9/348
[58] Field of Search ...................... 188/282, 317, 322

[56] References Cited

UNITED STATES PATENTS

| 1,529,235 | 3/1925 | Bechereau | 188/282 |
| 3,187,847 | 6/1965 | Karlgaard | 188/317 |
| 3,392,849 | 7/1968 | Rasmussen | 188/282 X |

FOREIGN PATENTS OR APPLICATIONS 1,107,155   8/1955   France .................................. 188/322

Primary Examiner—George E. A. Halvosa
Attorney—W. S. Pettigrew and J. C. Evans

[57] ABSTRACT

A piston and piston rod assembly for use in a hydraulic shock absorber of the direct acting type has an open ended piston with a base having a flat weld surface thereon fixedly secured to the end of a piston rod. Rebound and compression valving are secured in the open end of the piston and flow passageways are formed in the base of the piston in close non-interference relationship with the weld surface on the piston base. The piston and piston rod are connected by an improved method which maintains flow paths in the connected parts.

2 Claims, 9 Drawing Figures

PATENTED APR 3 1973

INVENTOR.
Joseph R. Stormer
BY
J.C. Evans
ATTORNEY

INVENTOR.
Joseph R. Stormer
BY
J.C. Evans
ATTORNEY

SHOCK ABSORBER WITH WELDED PISTON

This invention relates to hydraulic shock absorbers and more particularly to a welded piston and piston rod sub-assembly and the method of manufacture of the sub-assembly.

Piston and piston rod sub-assemblies for use in hydraulic shock absorbers have been interconnected by means of a threaded stud and nut fasteners and have additionally been interconnected by the use of hot upseat methods wherein a portion of the piston rod is deformed into a tight interlocking relationship with the piston. Furthermore, the use of resistance butt-welding to connect two pieces together is known.

In such arrangements, it is necessary to configure the component parts of the assembly to include adequate provision for the flow of hydraulic fluid from one side to the opposite side of the piston.

Additionally, it is necessary to configure the piston and piston rod components to produce a strong interconnection therebetween without interfering with the hydraulic flow patterns throughout the assembly.

The present invention pertains to an improved resistance welded connection formed by application of a D.C. weld sequence between a modified piston and piston rod configuration to form a high strength interconnection between the component parts and a good hydraulic flow path from one side to the opposite side of the piston through the piston.

More particularly, the invention relates to a sub-assembly wherein the piston has an open end thereon in which are located the valving components of the piston. Additionally, the piston includes a flat base portion having a weld surface formed concentrically around the longitudinal axis of the piston against which the butt end of the piston rod is welded. The piston base portion includes an annular dam which separates the weld surface from a non-restricted flow area through the base which freely directs hydraulic fluid from the valving components on one side of the piston to the opposite side of the piston.

An object of the present invention is to provide a strong interconnection between the piston and piston rod of a hydraulic shock absorber by the provision of a flat welding surface and a separating dam thereon against which the butt end of a piston rod is fixedly secured by the application of a pressure weld sequence.

Another object of the present invention is to improve a method for welding a shock absorber piston to a piston rod by forming the piston to have a base with peripheral flow openings therethrough, undercutting the base of an open ended piston to form a flat weld surface thereon surrounded by the flow openings, thereafter securing a peripheral seal on the piston rod and then concentrically locating a weld surface on the end of a piston rod with respect to the outer diameter of the seal on the periphery of the piston and thereafter applying a controlled pressure and D.C. electric current across the aligned and interconnected piston rod and piston to weld the parts together without weld splatter and to deform the weld end of the piston rod to fill an undercut surface on the piston without encroaching upon the flow openings through the piston.

Still another object of the present invention is to provide a welded piston and piston rod assembly for a shock absorber which includes a closed center piston base portion formed concentrically of the longitudinal axis of the piston and piston rod with an annular, outer peripheral dam thereon which separates heat and pressure deformed portions on the piston rod that are welded to the closed center base on the piston from inclined flow passageways through the piston into a valve chamber formed within the open end of the piston.

Further objects and advantages of the present invention will be apparent from the following description, reference being had to the accompanying drawings wherein a preferred embodiment of the present invention is clearly shown.

IN THE FIGS.:

Figure 1:
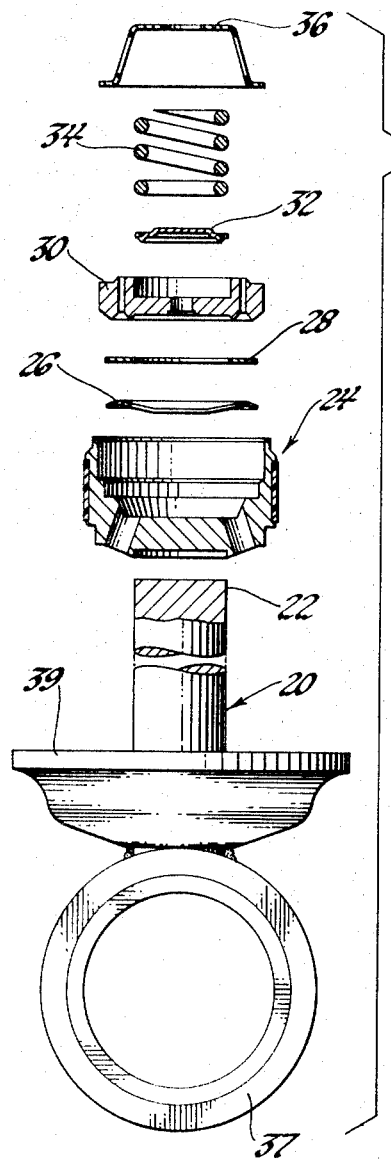
FIG. 1 is an exploded view of the component parts of the piston and piston rod assembly prior to assembly.

Referring now to the drawings, in FIG. 1, an exploded sub-assembly of a shock absorber is illustrated which includes a piston rod 20 having a weld end 22 thereon.

A piston 24 is illustrated which is adapted to be welded to the end 22 of the rod 20. The piston 24 is a hollow open ended member in which are located a compression intake valve spring 26 and an annular compression intake valve member 28.

They are supported on one end of an orifice plate 30. A rebound valve 32 is adapted to be supported on the other end of the orifice plate 30. It is controlled by a rebound spring 34. A valve cage 36 serves to hold all of the valving components within the open ended piston 24 as will be discussed. The rod is connected to a mounting ring 37 and a cover plate 39.

The aforementioned exploded components are utilized in practicing the noval and improved method of the present invention and are configured to produce an improved, novel piston and piston rod sub-assembly for use in hydraulic shock absorbers.

Figure 2:
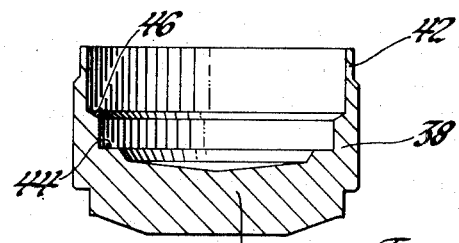
FIG. 2 is a vertical cross-sectional view of a cold formed piston blank.

The method of the present invention first includes the step of cold forming a wire slug into the shape of a hollow opened piston blank 38 as illustrated in FIG. 2. The blank includes a base portion 40 and an open ended flange 42 thereon.

Further, the blank includes a flat annular internal surface 44 which is concentrically arranged with respect to bevelled internal annular surface 46 between surface 44 and flange 42.

The next step of the method includes a sequence of metal cutting steps including the following:

The piston is undercut to form a closed center weld surface 48 on the base 40. Additionally, an annular dam 50 is formed between the surface 48 and a plurality of flow openings 52 which are formed through the base 40 and are located in concentric relationship with the weld surface 48.

Additionally, the hollow interior of the piston 38 is formed by a suitable cutting tool 54 to have a recess with an inclined surface 56 which intersects the openings 52 to provide a large unrestricted flow area 58 at the intersection between each opening 52 and the surface 56. The angle of this surface and that of surface 57 on the outside of base portion 40 minimize production problems by allowing drilling into and breaking out on surfaces perpendicular to the drill center during formation of openings 52. Additionally, the tool 54 serves to finish the annular shoulder 44 and the interior bevelled surface 46.

Another step in the metal forming sequence is that of forming an annular seal seat 60 on the outer periphery of the piston 38 by means of a tool 62.

Figure 3:
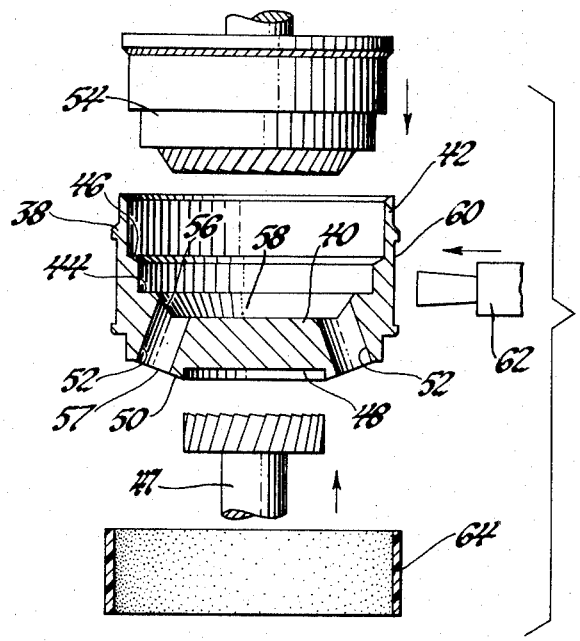
FIG. 3 is a diagrammatic view of a plurality of process steps wherein the piston blank is undercut to form a weld surface on the base thereof and a seal seat on the periphery thereof.
Figure 4:
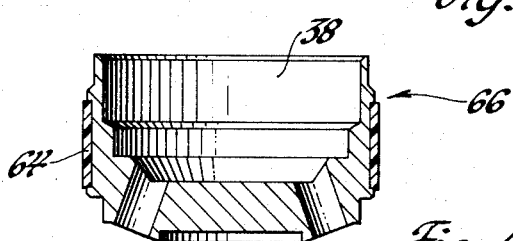
FIG. 4 is a view in vertical section showing the seal in place on the periphery of the piston.

The seal seat 60 extends from the flange 42 to a point adjacent the base 40 and is formed continuously around the outer surface of the piston 38 as illustrated in FIG. 3.

It is adapted to supportingly receive a sleeve formed nylon seal member 64 which is mounted on the piston 38 by being located concentrically therewith and then being slipped over the base 40 of the piston 38 into retained engagement with the seal seat 60.

The next step in the method includes the step of locating the completed piston and seal assembly 66 with respect to the piston rod 20.

Figure 5:
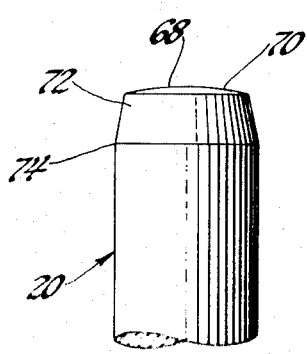
FIG. 5 is a fragmentary end view of a piston rod prior to connection to the piston.
Figure 6:
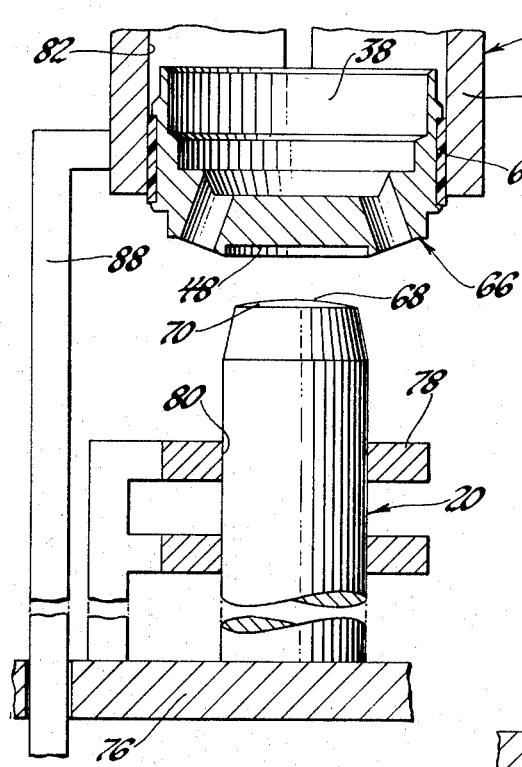
FIG. 6 is a view in vertical section showing a fixture arrangement for concentrically locating the piston rod with respect to the outer diameter of the seal on the piston in preparation to formation of a weld therebetween.
Figure 7:
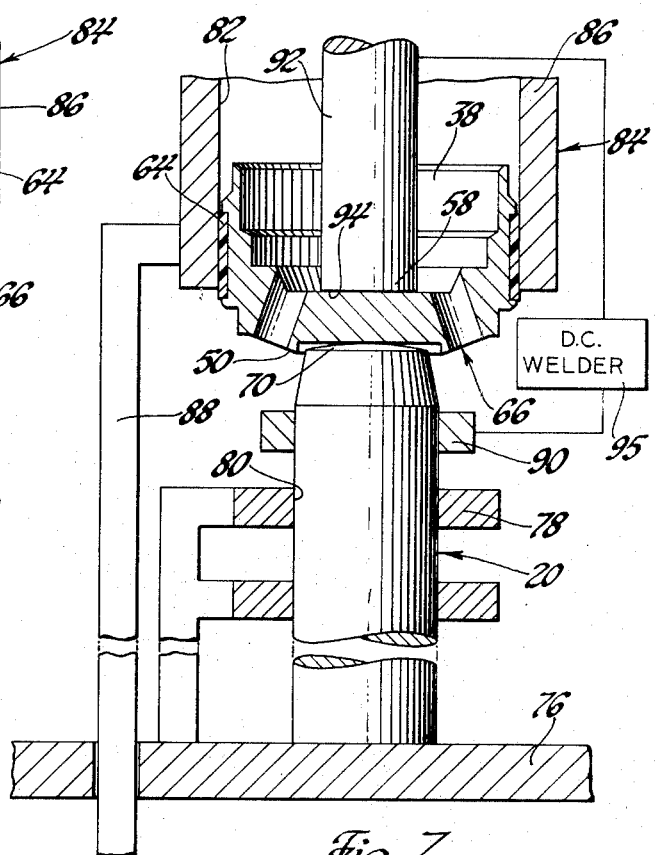
FIG. 7 is a view in vertical section showing the concentrically aligned piston seal, and piston rod and the welding position of the piston rod and piston along with electrodes for applying a D.C. weld current sequence between the piston and piston rod.

As illustrated in FIG. 5, the piston rod component has a tip portion 68 thereon formed on the end of a spherical weld production 70.

The projection 70 then merges with a second tapered portion 72 that has a lesser inclination and which is joined to the straight wall portions of the rod 20, at a circumferential transition 74 where the rod 20 has straight walls.

The positioning step of the invention includes locating the outer diameter of the straight wall portion of the rod 20 concentrically with respect to the outer diameter of the seal member 64.

More particularly, this is accomplished by means of a fixture which includes a base 76 and a hardened steel locating jaw 78 having an opening 80 therethrough in which is located the straight wall portions of the rod 20. The opening 80 in the jaws 78 is maintained in close concentricity with an opening 82 in an expanding collett 84, which has a head 86 and a base 88 adjustably supported on the base 76 for calibrated movement with respect to the jaws 78 and the opening 80 therein.

The piston and seal sub-assembly 66 is supported within the opening 82 of collett 88 which engages the OD of the seal 64 to maintain it in close concentric relationship with the straight wall portion of the rod 20.

In this alignment step, the rod 20 has its longitudinal axis aligned with respect to the longitudinal axis of piston 38 and furthermore the tip portion 68 on the rod 20 is located generally concentrically with respect to the flat weld surface 48 on the base 40.

The next step of the method includes locating a first electrode 90 in electrical contact with the straight wall portion of the piston rod 20 and a circular cross section electrode 92 so that flat end surface 94 thereon is supportingly received by a flat finished surface 96 on the inside of the base portion 40.

Then the parts are squeezed together by an application of force against the rod 20 and the electrode 92.

Once the force is applied, a D.C. weld power supply 95 is connected across the electrodes and is operated to produce a weld sequence including a squeeze step wherein the parts are pressed together for a predetermined number of welding cycles; thereafter, weld current is applied across the electrodes 90, 92 for a lesser number of weld cycles; the pressure is maintained on the parts through a quench period and thereafter a lesser weld current is passed across the electrodes during a temper period.

By virtue of the application of pressure and welding current during the welding sequence, the projection 70 of the rod 20 is forced into the undercut closed center weld surface 48 to fill it as the parts are being integrally connected by the welding of material in the base 40 to the material at the tip of the rod 20.

During this step, the dam 50 prevents plastic flow of molten material into the openings 52. This maintains a good open flow path through the cross sectional area of openings 52 at the outer surface of the base 40. The sequence produces a strong weld joint 99 between piston 24 and piston rod 20.

In one working embodiment, the parts were configured as follows to produce a strong joint without blockage of openings 52.

| Part | Dimension |
|---|---|
| Piston 24 | |
| O.D. Groove 60 | 0.965 inch |
| I.D. Surface 48 | 0.495 inch |
| Thickness Base 40 | 0.190 inch |
| Diameter Hole 52 | 0.125 inch |
| Inclination Hole 52 | 20° |
| Rod 20 | |
| O.D. | 0.489 inch |
| Projection 70 | 1.00 inch radius |
| Taper 72 | 12° – 0.125 inch |

Figure 8:
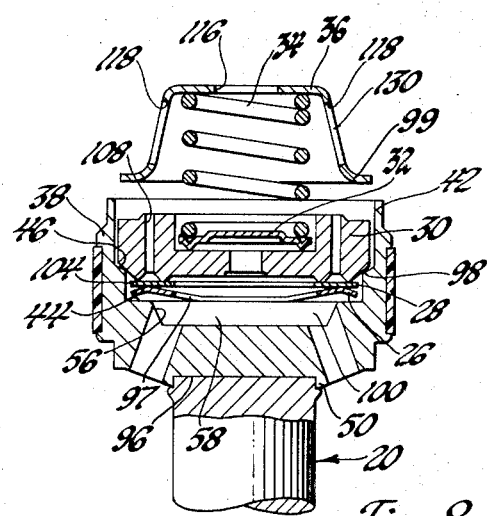
FIG. 8 is a view in vertical section of the welded piston rod, the piston and valve components prior to assembly.

The joined piston and piston rod are then removed from the aligning and welding fixture and the valving components are located within the hollow open end of the piston 24 as shown in FIG. 8.

The next step of the method includes locating the separate valving components within the hollow open end of the piston 38.

More particularly, this includes placing the parts in the alignment shown in FIG. 1 into the interior of the piston 38 as illustrated in FIG. 8.

In this configuration the spring 26 has a circumferential segment 97 supported by the annular shoulder 44 and the orifice plate 30 has a bevelled end portion 98 thereon supported by the annular bevelled surface 46.

Figure 9:
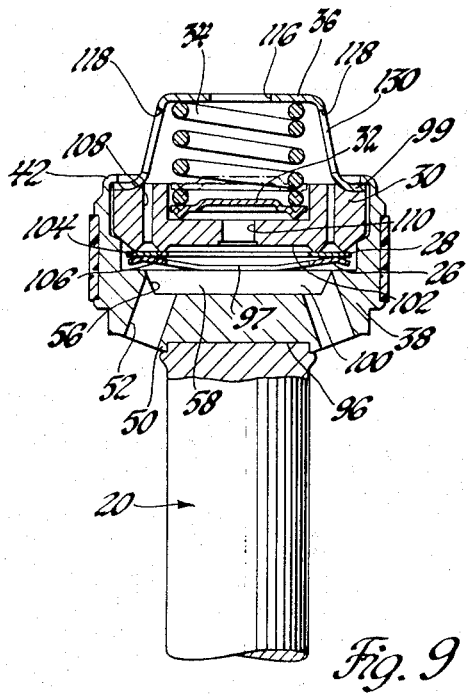
FIG. 9 is a view like FIG. 8 with the valving components located within the piston.

The rebound spring 34 holds the valve cage 36 slightly above the supported parts. Then the cage is moved axially with respect to the flange 42 within the piston 38 so that an annular flange 99 thereon is located axially within the opened ended flange 42. The flange 42 is then spun over the valve assembly. The completed assembly is illustrated in FIG. 9.

This article is an improved assembly for use in hydraulic shock absorbers.

In addition to including the strong weld joint 96 between piston 38 and rod 20, it includes an improved flow path configuration which is provided by the combination of the inclined surface 56 on the piston intersecting the openings 52 to provide openings 58 that allow relatively unrestricted flow from a control chamber 100 located between piston 38 and the interior surface 102 of the orifice plate 30.

Additionally, the openings 52 are inclined at an angle with respect to the longitudinal axis of the welded piston and piston rod so that fluid flows from the control chamber toward the center of piston 24. There is an unrestricted flow path through chamber 100 and it allows smooth flow in a diverging direction with respect to the rod during its reciprocation into and out of an oil filled pressure cylinder of a shock absorber.

The inclination of openings 52 locates them away from the interior annular shoulder 44 where it supports the compression spring 26. The support is at a point radially outwardly of the unrestricted opening 58 to avoid interference between the flow pattern of hydraulic fluid and the intake valve spring 26. The spring 26 biases the compression intake valve 28 against annular valve seats 104, 106 that separate a plurality of compression flow passageways 108 from the control chamber 100 during a rebound movement, wherein the piston rod moves outwardly of an oil filled pressure cylinder on the shock absorber.

During this movement, oil flows from the pressure cylinder through the inclined passageway 52 into unrestricted control chamber 100 from whence oil flows through a rebound opening 110 formed centrally of the orifice plate 30.

The opening 110 is controlled by a rebound valve 112 which is moved to an open position which is shown in broken lines in FIG. 9 during the rebound movement against the force of the rebound spring 114.

The oil thence flows through an end opening 116 in the cage 36 and side opening 118 thereon formed at spaced points along an inclined peripheral wall 130 of the cage 36.

During the compression stroke, the rebound valve 112 is closed and the compression valve 104 opens against the force of spring 26. Hydraulic fluid flows in an unrestricted path from the compression chamber through the openings in the valve cage thence through the control orifice 108 in the plate 30 into chamber 100 where the oil freely flows through the inclined openings 52 and the oblong entrance opening 58 formed by the intersection of surface 56 and the openings 52 and thence radially outwardly of the piston 20 into the rebound chamber of the pressure cylinder.

One representative weld sequence to connect the piston rod and piston of the embodiment in FIGS. 1 through 9 includes the following weld sequence:

| | |
|---|---|
| Weld Force | 1230 lbs. |
| Squeeze | 40 cycles |
| Weld Current | Max. 30,000 amps. — 5 cycles |
| Weld Downslope | 10 cycles |
| Weld Quench | 80 cycles |
| Weld Temper | 10 cycles |
| Weld Temper Current | 14,400 amps. |

This weld sequence is merely representative but illustrates a suitable sequence for obtaining the following objectives of the improved method, namely that of filling the undercut weld surface 48 with weld material and deforming the tapered end of the piston rod 20 into a fused relationship with the base 40 without overflowing the annular dam 50 to reduce the cross sectional area of the openings 52 that surround the dam 50.

Furthermore, the weld sequence results in an unusually high strength butt weld between the piston and piston rod making the sub-assembly suitable for use in heavy duty road use shock absorbers.

In the preferred embodiment of the present invention, the weld current across the electrodes is direct current. This current reduces splatter of the weld material out of the control region of the undercut surface 48 to further reduce the possibility of flowing or otherwise causing metal to reduce the flow area of the inclined openings 52.

What is claimed is as follows:

1. A combination piston and piston rod assembly for use in a double direct-acting hydraulic shock absorber of the type including a pressure cylinder filled with oil comprising: a hollow piston member having a base portion and an open ended flange portion thereon, said base portion having a closed center weld surface thereon, an annular dam surrounding said closed center surface, a piston rod having a tip welded in fused relationship with said piston on the closed center weld surface, a plurality of flow openings directed through said base into the interior of said hollow piston, said annular dam defining a barrier between weld material at said piston rod and said openings, each of said openings being inclined with respect to the longitudinal axis of said piston rod and serving to direct oil from the rod side of said piston in a converging direction into the center interior of said piston, means including an inclined internal surface forming a control chamber within said piston adjacent the base portion thereof, said openings intersecting with said inclined surface to afford an unrestricted flow path into said control chamber, an orifice plate located within said control chamber, a first valving element on one side of said orifice plate, a spring for maintaining said first valving element closed during a first movement of the piston and piston rod, an annular support shoulder in said piston at a point radially outward of said chamber, a second valving element on the opposite side of said orifice plate and spring means on said support shoulder for maintaining said second valving element closed during an opposite movement of said piston and said piston rod, said spring means and said second valving element being located by said shoulder radially outwardly of said control chamber away from fluid flow centrally therethrough, said orifice plate including a first and second plurality of openings therein each freely communicating with said open control chamber for allowing flow of fluid from said control chamber to opposite sides of said orifice plate within said hollow piston.

2. A combination piston and piston rod assembly for use in a double direct-acting hydraulic shock absorber of the type including a pressure cylinder filled with oil comprising: a hollow piston member having a base portion and an open ended flange portion thereon, said base portion having a closed center weld surface thereon, an annular dam surrounding said closed center surface, a piston rod having a top welded in fused relationship with said piston on the closed center weld surface, a plurality of flow openings directed through said base into the interior of said hollow piston, said annular dam defining a barrier between said weld material at said piston rod and said openings, each of said openings being inclined with respect to the longitudinal axis of said piston rod and serving to direct oil from the rod side of said piston in a converging direction into the center interior of said piston, means including an inclined internal surface forming a control chamber within said piston adjacent the base portion thereof, said openings intersecting with said inclined surface to afford an unrestricted flow path into said control chamber, an annular support shoulder in said piston at a point radially outward of said chamber, an orifice plate located within said control chamber, a first valving element on one side of said orifice plate, a spring for maintaining said first valving element closed during a first movement of the piston and piston rod, a second valving element on the opposite side of said orifice plate and spring means on said support shoulder for maintaining said second valving element closed during an opposite movement of said piston and said piston rod, said spring means and said second valving element being located by said shoulder radially outwardly of said control chamber away from fluid flow centrally therethrough, said orifice plate including a first and second plurality of openings therein each freely communicating with said open control chamber for allowing flow of fluid from said control chamber to opposite sides of said orifice plate within said hollow piston, an inclined outer surface on said piston formed continuously around said piston, said flow openings being directed through said outer inclined surface to locate the entrance to the openings on the rod side of the piston away from interferring fluid flow relationship with the outer surface of said piston rod at the point it is welded to said base portion.

* * * * *